United States Patent
Sakayama

(10) Patent No.: US 10,244,465 B2
(45) Date of Patent: Mar. 26, 2019

(54) INFORMATION PROCESSING APPARATUS AND NON-TRANSITORY COMPUTER READABLE STORAGE MEDIUM FOR DETERMINING A COMMUNICATION UNIT HAVING A FASTER SPEED FOR ENCRYPTED COMMUNICATION

(71) Applicant: FUJI XEROX CO., LTD., Tokyo (JP)

(72) Inventor: Takashi Sakayama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/814,945

(22) Filed: Nov. 16, 2017

(65) Prior Publication Data

US 2018/0288692 A1   Oct. 4, 2018

(30) Foreign Application Priority Data

Mar. 28, 2017   (JP) ................. 2017-063578

(51) Int. Cl.
| | | |
|---|---|---|
| *H04W 48/18* | (2009.01) | |
| *H04W 84/12* | (2009.01) | |
| *H04W 88/06* | (2009.01) | |
| *H04W 72/04* | (2009.01) | |
| *H04N 1/327* | (2006.01) | |
| *H04L 29/06* | (2006.01) | |
| *H04W 12/10* | (2009.01) | |
| *H04N 1/333* | (2006.01) | |

(52) U.S. Cl.
CPC ......... *H04W 48/18* (2013.01); *H04L 63/0428* (2013.01); *H04N 1/32797* (2013.01); *H04N 1/33323* (2013.01); *H04W 12/10* (2013.01); *H04W 72/0453* (2013.01); *H04N 2201/0094* (2013.01); *H04N 2201/3281* (2013.01)

(58) Field of Classification Search
CPC ..... H04W 48/16; H04W 84/12; H04W 88/06; H04W 4/80; H04W 76/14; H04W 48/18; H04W 84/18; H04W 40/246; H04W 36/165; H04W 76/30; H04W 12/10; H04W 72/0453; H04L 63/0428; H04N 1/32797; H04N 1/33323; H04N 2201/0094; H04N 2201/3281
USPC .......... 455/41.2, 7, 41.1, 41.3; 370/338, 310
See application file for complete search history.

(56) References Cited

U.S. PATENT DOCUMENTS

| | | | |
|---|---|---|---|
| 6,393,031 B1 | 5/2002 | Isomura | |
| 2009/0111510 A1 | 4/2009 | Ono | |
| 2011/0107083 A1* | 5/2011 | Nomura | ................ H04N 7/165 713/150 |

(Continued)

FOREIGN PATENT DOCUMENTS

| | | |
|---|---|---|
| JP | H11-252662 A | 9/1999 |
| JP | 2009-303107 A | 12/2009 |
| JP | 4716144 B2 | 7/2011 |

*Primary Examiner* — Philip Sobutka
(74) *Attorney, Agent, or Firm* — Oliff PLC

(57) ABSTRACT

An information processing apparatus includes plural communication units, a determination unit, and a controller. The communication units are configured to conduct a wireless communication at different communication speeds. The determination unit is configured to determine a communication unit having a faster communication speed in order to transmit or receive an encrypted communication object. The controller is configured to perform a control to start a communication by the communication unit determined by the determination unit.

9 Claims, 11 Drawing Sheets

(56) References Cited

U.S. PATENT DOCUMENTS

2012/0207139 A1* 8/2012 Husted .................... H04L 69/08
370/338

* cited by examiner

INFORMATION PROCESSING APPARATUS AND NON-TRANSITORY COMPUTER READABLE STORAGE MEDIUM FOR DETERMINING A COMMUNICATION UNIT HAVING A FASTER SPEED FOR ENCRYPTED COMMUNICATION

CROSS-REFERENCE TO RELATED APPLICATIONS

This application is based on and claims priority under 35 USC 119 from Japanese Patent Application No. 2017-063578 filed Mar. 28, 2017.

BACKGROUND

Technical Field

The present invention relates to an information processing apparatus and a non-transitory computer readable storage medium.

SUMMARY

According to an aspect of the invention, an information processing apparatus includes plural communication units, a determination unit, and a controller. The communication units are configured to conduct a wireless communication at different communication speeds. The determination unit is configured to determine a communication unit having a faster communication speed in order to transmit or receive an encrypted communication object. The controller is configured to perform a control to start a communication by the communication unit determined by the determination unit.

BRIEF DESCRIPTION OF THE DRAWINGS

Exemplary embodiments of the present invention will be described in detail based on the following figures, wherein.

DETAILED DESCRIPTION

First, prior to describing the present exemplary embodiment, premises of the present exemplary embodiment or an information processing apparatus using the present exemplary embodiment will be described. It should be noted that the descriptions are intended to facilitate understandings of the present exemplary embodiment.

In the related art, a smart phone or the like is equipped with multiple different communication units and selects a communication unit to be connected based on a specific priority or the like to conduct a communication.

In the technologies described in Japanese Patent No. 4716144 (corresponding to US 2009/0111510 A1), JP-A-11-252662 (corresponding to U.S. Pat. No. 6,393,031), and JP-A-2009-303107, when a communication is conducted (or prior to starting a communication), an optimum communication unit is selected and then the communication is conducted.

Meanwhile, in the wireless communication, an object to be communicated ("communication object") may be encrypted. When the communication object is encrypted, the communication traffic may increase, as compared to the case where the communication object is transmitted in a plain text as it is. For example, the capacity of the communication object may increase, and the number of communication times may increase since communication for exchanging encryption keys and the like is required. In addition, encrypting implies that the communication object is important. Further, an encryption process (a counterpart decryption process) is required, as compared to the case where the plain text itself is communicated. That is, it takes time for the encryption process itself, and power is required for the encryption process itself.

According to the present exemplary embodiment, when a communication object subjected to the encryption process is transmitted/received, a communication unit having a fast communication speed may be allocated. Thus, one or more of the following effects are derived: making the communication time to be close to the communication time for the plain text even if the communication capacity increases due to the encryption; reducing the communication time for the important communication object so as to reduce the possibility of tapping; reducing the communication time including the time for the encryption process; and reducing consumption of power including the power for the encryption process.

Hereinafter, an exemplary embodiment suitable for implementing the present invention will be described with reference to the accompanying drawings.

Figure 1:
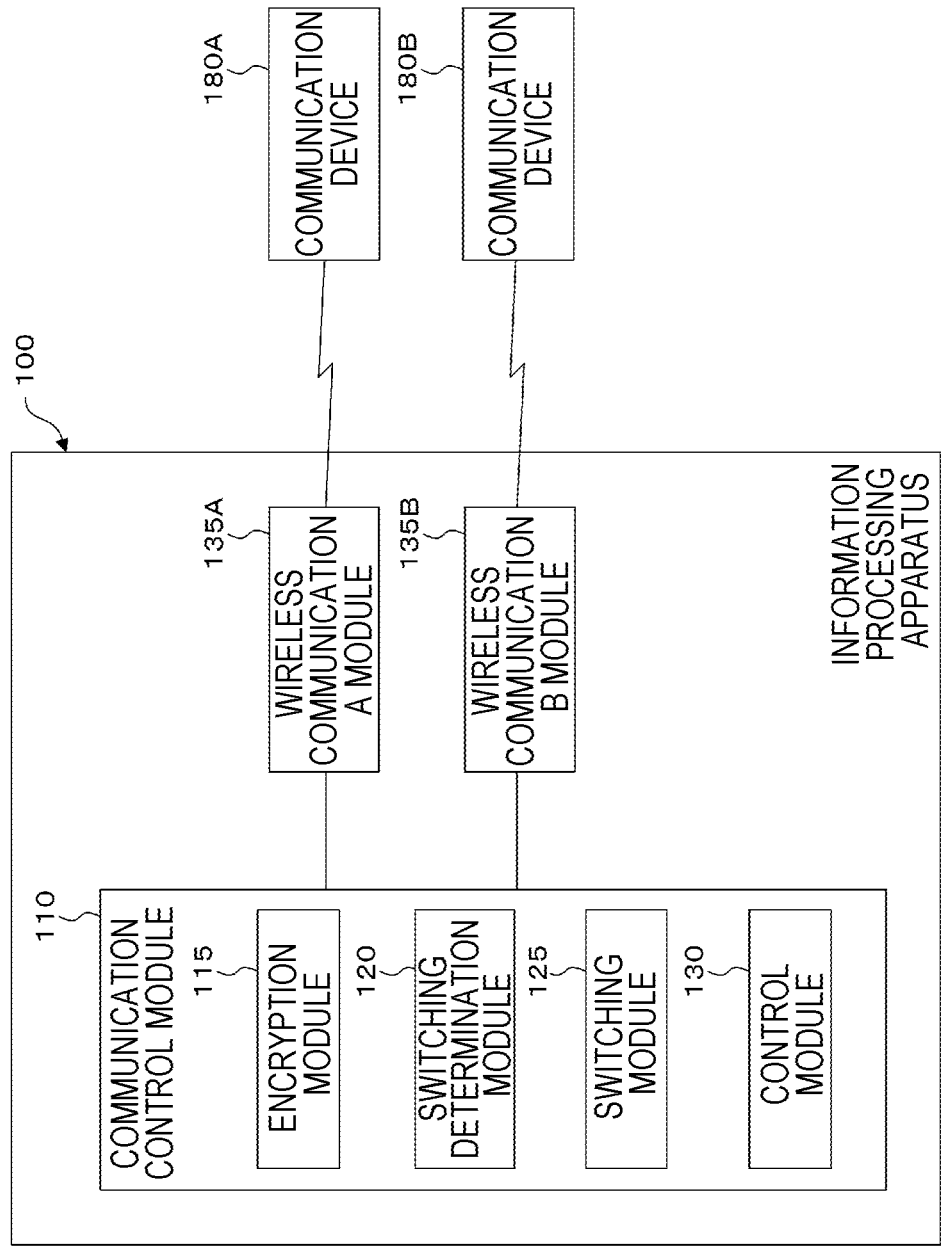
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the present exemplary embodiment conducts a wireless communication with a communication device 180. The information processing apparatus 100 includes a communication control module 110, a wireless communication A module 135A, and a wireless communication B module 135B as illustrated in FIG. 1. The number of the wireless communication modules 135 may be three or more.

The communication device 180A is connected to the wireless communication A module 135A of the information processing apparatus 100 via a communication line. The communication device 180A is capable of conducting a wireless communication with the wireless communication A module 135A using a certain transmission method and channel.

The communication device 180B is connected to the wireless communication B module 135B of the information processing apparatus 100 via a communication line. The communication device 180B is capable of conducting a wireless communication with the wireless communication B module 135B using a certain transmission method and channel.

The communication device 180 is, for example, a portable information communication device (including a mobile phone, a smart phone, a mobile device, a wearable computer, and the like), a laptop PC or an access point. There may be provided multiple communication devices 180 that are capable of conducting a wireless communication with the information processing apparatus 100.

Each communication device 180 may conduct a wireless communication by multiple transmission methods and multiple channels.

The communication device 180 requests the information processing apparatus 100 to provide a service, through the wireless communication. Here, the "service" refers to a function or an operation provided by conducting the communication and is also called a job. For example, examples of the service include a printing process service for making a printing instruction and an image reading service for receiving an image reading result, with respect to an image processing apparatus 200 including the information processing apparatus 100.

The wireless communication A module 135A is connected to the communication control module 110 and also connected to the communication device 180A via the communication line. The wireless communication A module 135A is capable of conducting the wireless communication with the communication device 180A by the certain transmission method and channel. For example, the communication speed of the wireless communication A module 135A is different from the communication speed of the wireless communication B module 135B. In the following descriptions, for example, it is assumed that the communication speed of the wireless communication A module 135A is faster than the communication speed of the wireless communication B module 135B.

The wireless communication B module 135B is connected to the communication control module 110 and also connected to the communication device 180B via the communication line. The wireless communication B module 135B is capable of conducting the wireless communication with the communication device 180B by the certain transmission method and channel. For example, the communication speed of the wireless communication B module 135B is different from the communication speed of the wireless communication A module 135A. In the following descriptions, for example, it is assumed that the communication speed of the wireless communication B module 135B is slower than the communication speed of the wireless communication A module 135A.

Each wireless communication module 135 may be capable of conducting a wireless communication by multiple transmission methods and multiple channels. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 135 may have multiple channels (wireless communication paths). Of course, each of all the transmission methods may have multiple channels.

The transmission methods by which the wireless communication module 135 is capable of conducting a wireless communication may include at least the communication standard of IEEE802.11ad.

The communication control module 110 includes an encryption module 115, a switching determination module 120, a switching module 125, and a control module 130. The communication control module 110 is connected to the wireless communication A module 135A and the wireless communication B module 135B. The communication control module 110 controls the wireless communication between the information processing apparatus 100 and the communication device 180.

The encryption module 115 encrypts a communication object. The technologies of the related art may be used for the encryption. Public key encryption or common key encryption may be used. In addition, the communication object may be any one of texts, an image, sound, a moving image and the like, or a combination thereof.

If a communication X has been being conducted and if a communication Y is attempted to be started, the switching determination module 120 determines whether to use the wireless communication module 135 (either of the wireless communication A module 135A or the wireless communication B module 135B) that is being used in the communication X, for the communication Y.

For example, if the communication A module 135A having a fast communication speed is being used in the communication X that has already been being conducted with the communication device 180A and if the communication device 180B attempting to start the communication Y is getting ready to transmit or receive a communication object after being encrypted to or from the information processing apparatus 100, the switching determination module 120 may switch the wireless communication A module 135A in the communication X with the communication device 180A to the wireless communication B module 135B, so as to use the wireless communication A module 135A for the communication with the communication device 180B.

In addition, the switching determination module 120 may determine the wireless communication module 135, by using a data amount increased by the encryption, a communication time increased by the encryption, a time required for the encryption, and a power amount required for the encryption, or a combination thereof.

The switching module 125 determines the wireless communication module 135 in accordance with whether the communication object to be communicated with the communication device 180 that is attempting to conduct a communication is encrypted. Here, the encryption process may be performed by the encryption module 115 or the communication device 180 as a communication counterpart. The encryption process has only to be performed prior to the beginning of a communication. Thus, the communication object may have been encrypted at the time when the wireless communication module 135 is determined by the switching module 125, or may be encrypted thereafter.

For example, the switching module 125 determines the wireless communication module 135 having a faster communication speed in order to transmit or receive the communication object after being encrypted. Here, the "wireless communication module 135 having a faster communication speed" means a wireless communication module having the fastest communication speed among the wireless communication modules 135 capable of conducting a communication.

Then, the control module 130 performs a control to start a wireless communication using the wireless communication module 135 determined by the switching module 125.

In addition, the switching module 125 may determine the wireless communication module 135 in accordance with a data amount increased by the encryption. Here, the "data amount increased by the encryption" means a difference obtained by subtracting a data amount of the communication object before the encryption from a data amount of the communication object after the encryption. For example, if the "data amount increased by the encryption" is larger than or equal to or larger than a predetermined threshold value, the switching module 125 may determine the wireless communication module 135 having the faster communication speed.

In addition, the switching module 125 may determine the wireless communication module 135 in accordance with a communication time increased by the encryption. Here, the "communication time increased by the encryption" means a difference obtained by subtracting a communication time of the communication object before the encryption from a communication time of the communication object after the encryption when a target wireless communication module 135 is selected. Thus, the difference further decreases as the wireless communication module 135 has a faster communication speed. For example, two wireless communication modules 135 are provided (the wireless communication A module 135A and the wireless communication B module 135B). If the "communication time increased by the encryption" is larger than or equal to or larger than the predetermined threshold value with the assumption that a communication has been being conducted by the wireless communication B module 135B having a slow communication speed, the wireless communication A module 135A having a faster communication speed may be determined. In addition, if three or more wireless communication modules 135 are provided, the switching module 125 may determine a wireless communication module 135 by which the "communication time increased by the encryption" is less than or equal to or less than the predetermined threshold value.

In addition, the switching module 125 may determine the wireless communication module 135 in accordance with a time required for the encryption. Here, as the "time required for the encryption," (i) an actual measurement value (a time from the start of the encryption process to the end of the encryption process when the encryption has already been performed) or (ii) a value calculated from a data amount before the encryption (the calculation formula for the process time is determined by an encryption method in advance) may be used. For example, if the "time required for the encryption" is larger than or equal to or larger than a predetermined threshold value, the switching module 125 may determine the wireless communication module 135 having a faster communication speed. In addition, the "time required for the encryption" may include a use amount of a CPU.

In addition, the switching module 125 may determine the wireless communication module 135 in accordance with a power amount required for the encryption. Here, as the "power amount required for the encryption," (i) an actual measurement value (a time from the start of the encryption process to the end of the encryption process when the encryption has already been performed) or (ii) a value calculated from a data amount before the encryption (the calculation formula for the power amount is determined by an encryption method in advance) may be used. For example, if the "power amount required for the encryption"

is larger than or equal to or larger than a predetermined threshold value, the switching module 125 may determine the wireless communication module 135 having a faster communication speed.

In addition, if the wireless communication module 135 has multiple channels and if the service that is conducting a communication uses the multiple channels, the switching module 125 may determine the wireless communication module 135 by reducing the number of channels and allocating the reduced channels to the service that is attempting to start a communication.

In addition, according to the determination by the switching determination module 120, the switching module 125 may switch a wireless communication module 135 that is being used in a communication that has already been being conducted (for example, the wireless communication module 135 having a fast communication speed) to another wireless communication module 135 (for example, the wireless communication module having a slow communication speed), and allocate the free wireless communication module 135 (for example, the wireless communication module having the fast communication speed) to the communication device 180 that is attempting to newly start a communication so as to conduct the communication.

Figure 2:
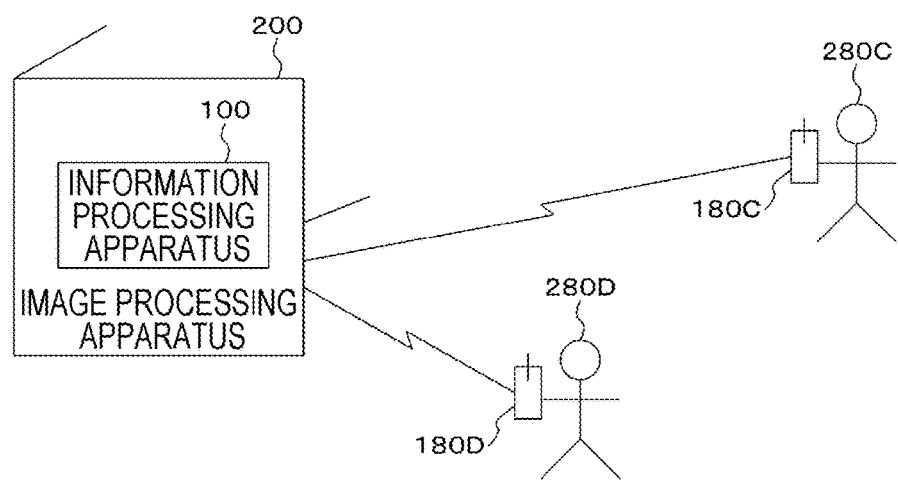
FIG. 2 is an explanatory view illustrating an exemplary system configuration using the exemplary embodiment.

FIG. 2 is an explanatory view illustrating an exemplary system configuration using the present exemplary embodiment.

The image processing apparatus 200 includes the information processing apparatus 100. The image processing apparatus 200, a communication device 180C of a user 280C, and a communication device 180D of a user 280D are connected to each other via communication lines. Especially, the image processing apparatus 200 is machine that is installed in an office or the like and used by multiple users. The image processing apparatus 200 may be used through the multiple communication devices 180 simultaneously. The image processing apparatus 200 is, for example, a copier, a facsimile, a scanner, a printer, or a multifunctional machine (an image processing apparatus having two or more functions of a scanner, a printer, a copier, a facsimile, and the like).

In the image processing apparatus 200, an optimal wireless communication module 135 is selected from the multiple wireless communication modules 135. Even if the selected wireless communication module 135 is being used in another service (another job), the wireless communication module 135 being used in communication is switched so that the communication may be conducted by an optimal wireless communication module 135.

Specific examples will be described.

SPECIFIC EXAMPLE (1)

The user 280C is attempting to perform a process (image reading service) of transmitting a scanned image to the communication device 180C by performing a scanning operation for the image processing apparatus 200, and storing the image to be received in the communication device 180C. Here, the encryption process is performed in this communication. In this case, a wireless communication is conducted with the communication device 180C by, for example, the transmission method having the fastest communication speed (for example, IEEE802.11ad), among the transmission methods that are not being used in the image processing apparatus 200.

SPECIFIC EXAMPLE (2)

The user 280C is attempting to perform a process (image reading service) of transmitting a scanned image to the communication device 180C by performing a scanning operation for the image processing apparatus 200, and storing the image in the communication device 180C. That is, the image processing apparatus 200 and the communication device 180C are communicating with each other. Meanwhile, it is assumed that the encryption process has not been performed in this communication.

Thereafter, the user 280D transmits a printing instruction to the image processing apparatus 200 by operating the communication device 280D. Here, the encryption process is performed in this communication. In this case, the switching process is performed.

For example, if a wireless communication has already been being conducted with the communication device 180C using the transmission method of IEEE802.11ad, in order to conduct a communication with the communication device 180D, the wireless communication with the communication device 180C is switched to the wireless communication using the transmission method of IEEE802.11n through the above-described switching, and a wireless communication is conducted with the communication device 180D using the transmission method of IEEE802.11ad.

Figure 3:
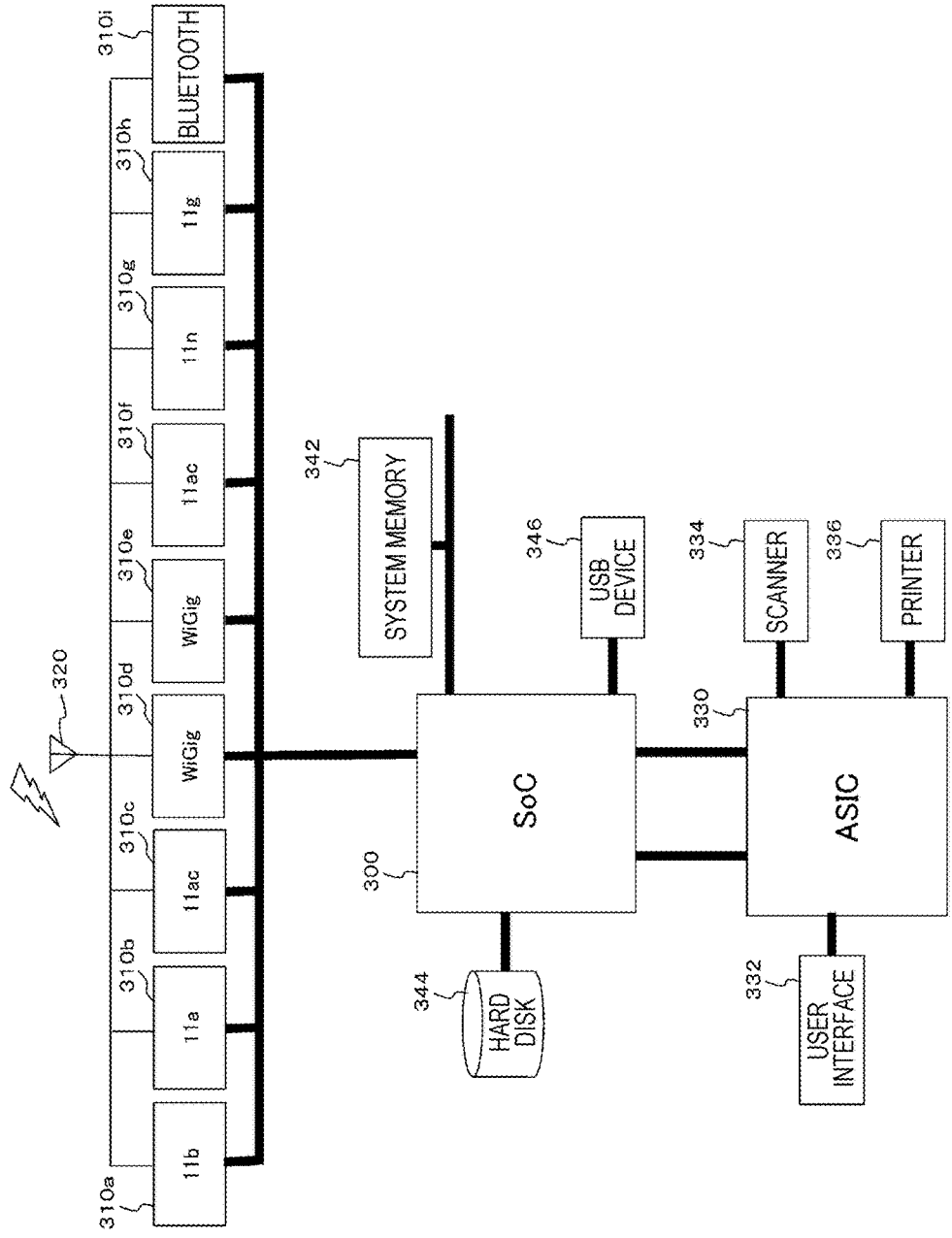
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310*a*, 11a:310*b*, 11ac:310*c*, WiGig:310*d*, WiGig:310*e*, 11ac:310*f*, 11n:310*g*, 11g:310*h*, Bluetooth 310*i*, an antenna 320, a system memory 342, a hard disk 344, a USB device 346, an application specific integrated circuit (ASIC) 330, a user interface 332, a scanner 334, and a printer 336.

11b:310*a* is connected to the antenna 320 and the SoC 300. 11a:310*b* is connected to the antenna 320 and the SoC 300. 11ac:310*c* is connected to the antenna 320 and the SoC 300. WiGig:310*d* is connected to the antenna 320 and the SoC 300. WiGig:310*e* is connected to the antenna 320 and the SoC 300. 11ac:310*f* is connected to the antenna 320 and the SoC 300. 11n:310*g* is connected to the antenna 320 and the SoC 300. 11g:310*h* is connected to the antenna 320 and the SoC 300. Bluetooth 310*i* is connected to the antenna 320 and the SoC 300. The antenna 320 maybe shared. Further, multiple antennas 320 maybe provided. The combination of the communication devices (communication chips) 310 and the antenna 320 is an example implementing the wireless communication modules 135 illustrated in the example of FIG. 1. 11b:310*a* to 11g:310*h* comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310*i* other than the "IEEE802.11 standard" may be used.

The SoC 300 is connected to 11b:310*a*, 11a:310*b*, 11ac:310*c*, WiGig:310*d*, WiGig:310*e*, 11ac:310*f*, 11n:310*g*, 11g:310*h*, Bluetooth 310*i*, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. In the hard disk 344, for example, communication contents are stored.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
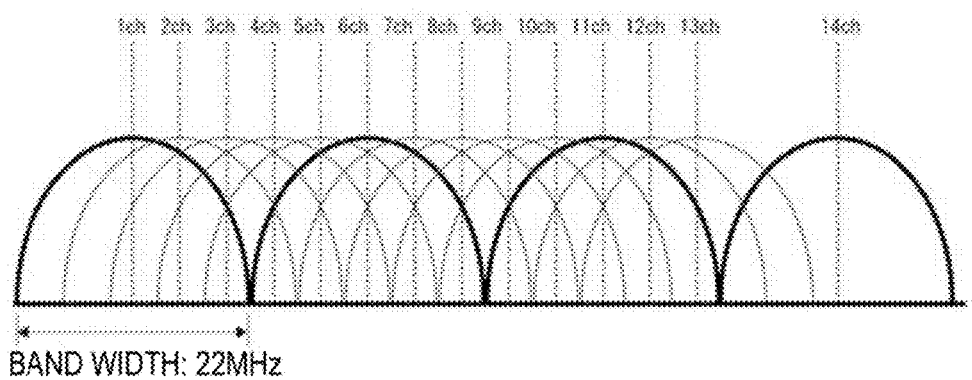
FIGS. 4A and 4B are explanatory views illustrating examples of channels.
Figure 4B:
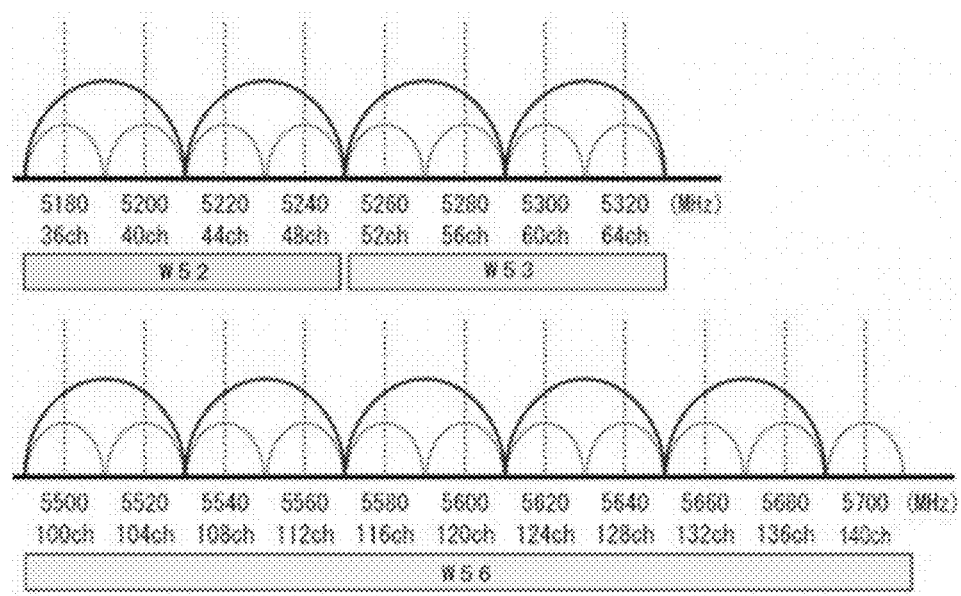

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch a transmission method even during a communication.

In addition, it may be effective to switch a channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching of a channel, a "channel bonding" function (a high speed mode) may be included. That is, as the switching of a channel, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching of a transmission method, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
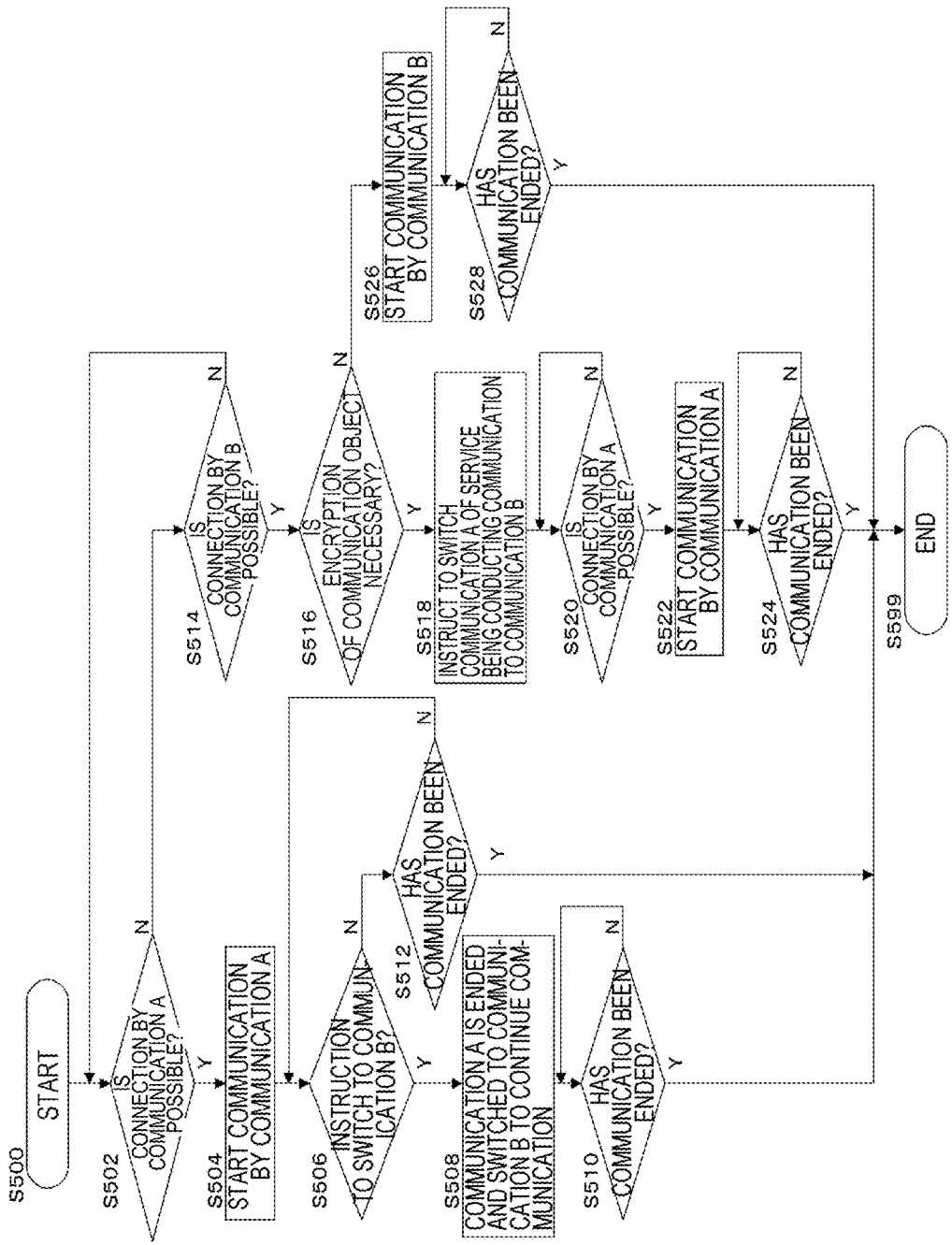
FIG. 5 is a flowchart illustrating an exemplary process by the exemplary embodiment.

FIG. 5 is a flowchart illustrating an exemplary process by the present exemplary embodiment.

Hereinafter, in the descriptions of the flowchart, for example, a communication A indicating a transmission method is the WiGig communication, and a communication B indicating a transmission method is another Wi-Fi communication.

In step S502, it is determined whether a connection by the communication A is possible. If it is determined that the connection by the communication A is possible, the process proceeds to step S504. Otherwise (for example, when the communication A has already been used), the process proceeds to step S514.

In step S504, a communication is started by the communication A.

In step S506, it is determined whether an instruction to switch the communication A to the communication B has been made. If it is determined that the instruction has been made, the process proceeds to step S508. Otherwise, the process proceeds to step S512.

In step S508, the communication A is ended and switched to the communication B, and the communication is continued.

In step S510, it is determined whether the communication has been ended. If it is determined that the communication has been ended, the process is ended (step S599). Otherwise, the process stands by until the communication is ended.

In step S512, it is determined whether the communication has been ended. If it is determined that the communication has been ended, the process is ended (step S599). Otherwise, the process returns to step S506.

In step S514, it is determined whether a connection by the communication B is possible. If it is determined that a connection by the communication B is possible, the process proceeds to step S516. Otherwise, the process returns to step S502.

In step S516, it is determined whether the encryption process of the communication object is necessary. If it is determined that the encryption process is necessary, the process proceeds to step S518. Otherwise, the process proceeds to step S526.

It should be noted at the time of the determination in step S516, the encryption may or may not have been performed. The encryption has only to be performed prior to a communication.

In addition, the determination process in step S516 may be performed as follows: (1) It is determined whether the "data amount increased by the encryption" is larger than or equal to or larger than the predetermined threshold value. If it is determined that the condition is met, the process proceeds to step S518. Otherwise, the process proceeds to step S526. (2) It is determined whether the "communication time increased by the encryption when the communication B is used" is larger than or equal to or larger than the predetermined threshold value. If it is determined that the condition is met, the process proceeds to step S518. Otherwise, the process proceeds to step S526. (3) It is determined whether the "time required for the encryption" is larger than or equal to or larger than the predetermined threshold value. If it is determined that the condition is met, the process proceeds to step S518. Otherwise, the process proceeds to step S526. (4) It is determined whether the "power amount required for the encryption" is larger than or equal to or larger than a predetermined threshold value. If it is determined that the condition is met, the process proceeds to step S518. Otherwise, the process proceeds to step S526. (5) A combination (for example, the logical product (AND) the logical sum (OR)) of two or more of the conditions described in the items (1) to (4).

In step S518, an instruction is made to switch the communication A of the service that is conducting the communication, to the communication B. The instruction in step S518 corresponds to the instruction received in step S506.

In step S520, it is determined whether a connection by the communication A is possible. If it is determined that a connection by the communication A is possible, the process proceeds to step S522. Otherwise, the process stands by until the connection becomes possible.

In step S522, a communication is started by the communication A.

In step S524, it is determined whether the communication has been ended. If it is determined that the communication has been ended, the process is ended (step S599). Otherwise, the process stands by until the communication is ended.

In step S526, a communication is started by the communication B.

In step S528, it is determined whether the communication has been ended. If it is determined that the communication has been ended, the process is ended (step S599). Otherwise, the process stands by until the communication is ended.

Figure 6:
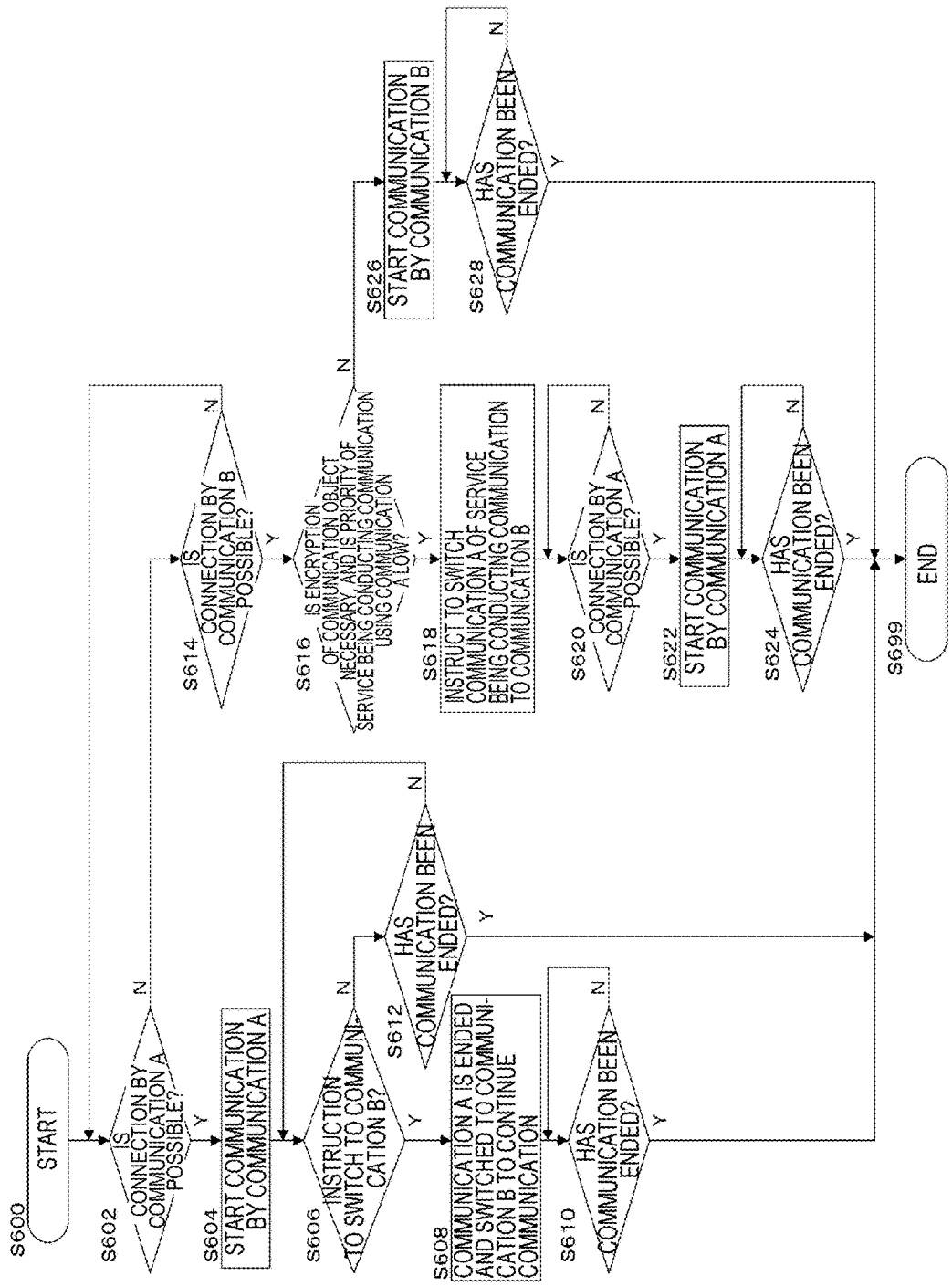
FIG. 6 is a flowchart illustrating an exemplary process by the exemplary embodiment.

FIG. 6 is a flowchart illustrating an exemplary process by the present exemplary embodiment. In FIG. 6, S516 in the flowchart illustrated in the example of FIG. 5 is modified.

In step S602, it is determined whether a connection by the communication A is possible. If it is determined that a connection by the communication A is possible, the process proceeds to step S604. Otherwise (for example, when the communication A has already been used), the process proceeds to step S614.

In step S604, a communication is started by the communication A.

In step S606, it is determined whether an instruction to switch the communication A to the communication B has been made. If it is determined that the instruction has been made, the process proceeds to step S608. Otherwise, the process proceeds to step S612.

In step S608, the communication A is ended and switched to the communication B, and the communication is continued.

In step S610, it is determined whether the communication has been ended. If it is determined that the communication has been ended, the process is ended (step S699). Otherwise, the process stands by until the communication is ended.

In step S612, it is determined whether the communication has been ended. If it is determined that the communication has been ended, the process is ended (step S699). Otherwise, the process returns to step S606.

In step S614, it is determined whether a connection by the communication B is possible. If it is determined that a connection by the communication B is possible, the process proceeds to step S616. Otherwise, the process returns to step S602.

In step S616, it is determined whether the encryption process of the communication object is necessary and whether the priority (including "priority level") of the service that is conducting a communication using the communication A is low. If it is determined that the encryption process of the communication object is necessary and that the priority of the service that is conducting the communication using the communication A is low, the process proceeds to step S618. Otherwise, the process proceeds to step S626.

For example, the priority of the printing process service is higher than the priority of the image reading process service. Thus, if the encryption process of the communication object is necessary, if the service requested by the communication device 180 to start a communication is the printing process service, and if the service that is conducting the communication using the communication A is the image reading service, the process proceeds to step S618 to perform the switching process.

In addition, the condition that the "encryption process of the communication object is necessary" may be replaced with any of the five conditions provided in the descriptions of step S516 of the flowchart illustrated in the example of FIG. 5.

In step S618, an instruction is made to switch the communication A of the service that is conducting the communication, to the communication B. The instruction in step S618 corresponds to the instruction received in step S606.

In step S620, it is determined whether a connection by the communication A is possible. If it is determined that a connection by the communication A is possible, the process proceeds to step S622. Otherwise, the process stands by until the connection becomes possible.

In step S622, a communication is started by the communication A.

In step S624, it is determined whether the communication has been ended. If it is determined that the communication has been ended, the process is ended (step S699). Otherwise, the process stands by until the communication is ended.

In step S626, a communication is started by the communication B.

In step S628, it is determined whether the communication has been ended. If it is determined that the communication has been ended, the process is ended (step S699). Otherwise, the process stands by until the communication is ended.

Figure 7:
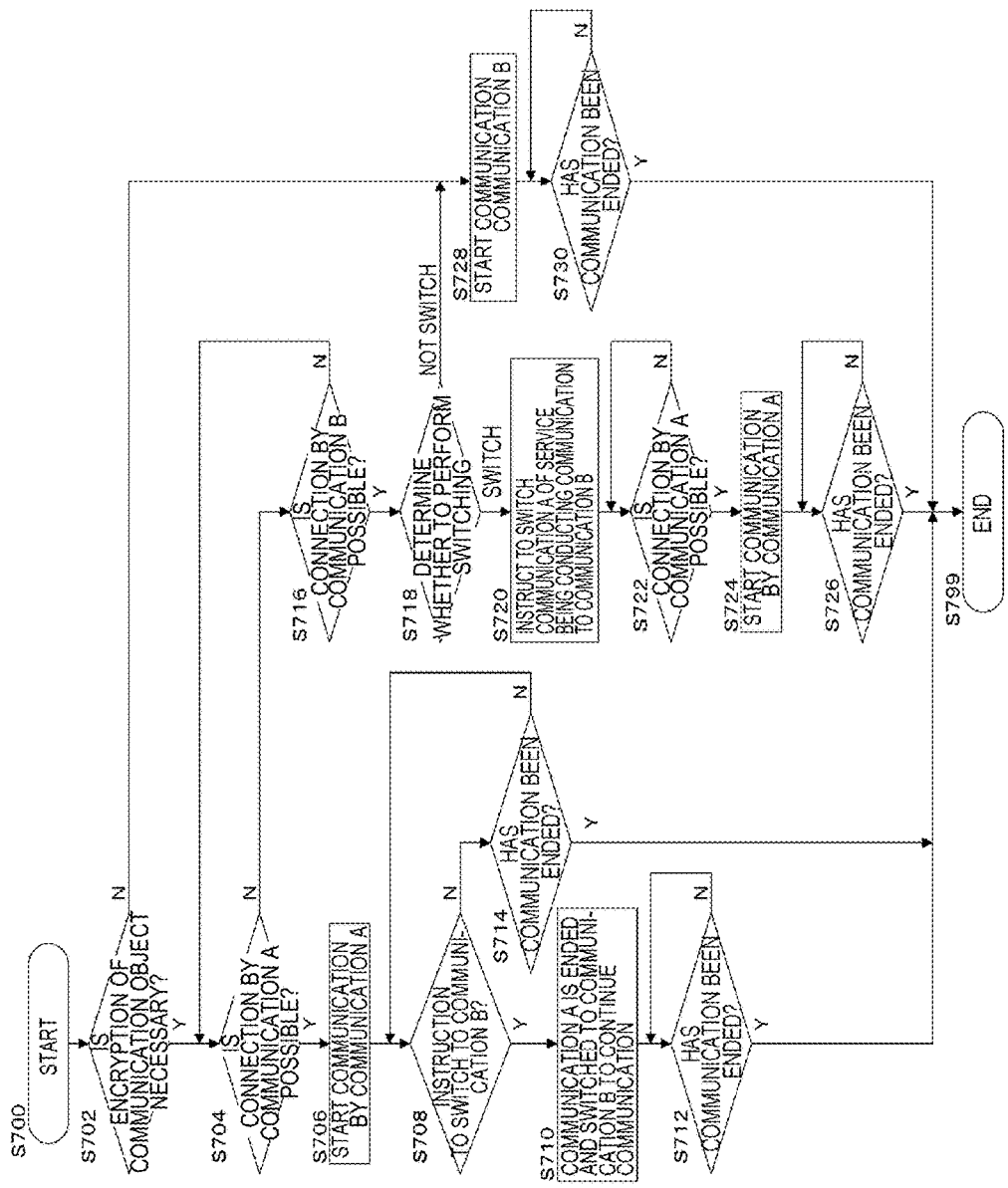
FIG. 7 is a flowchart illustrating an exemplary process by the exemplary embodiment.

FIG. 7 is a flowchart illustrating an exemplary process by the present exemplary embodiment.

In step S702, it is determined whether the encryption process of the communication object is necessary. If it is determined that the encryption process is necessary, the process proceeds to step S704. Otherwise, the process proceeds to step S728. If it is determined in the determination process of step S702 that the encryption process of the communication object is necessary in order to start a communication, transmission/reception can be performed by the communication A having the fast communication speed.

In addition, the condition that the "encryption process of the communication object is necessary" may be replaced with any of the five conditions provided in the descriptions of step S516 of the flowchart illustrated in the example of FIG. 5.

In step S704, it is determined whether a connection by the communication A is possible. If it is determined that a connection by the communication A is possible, the process proceeds to step S706. Otherwise (for example, when the communication A has already been used), the process proceeds to step S716.

In step S706, communication is started by the communication A.

In step S708, it is determined whether an instruction to switch the communication A to the communication B has been made. If it is determined that the instruction has been made, the process proceeds to step S710. Otherwise, the process proceeds to step S714.

In step S710, the communication A is ended and switched to the communication B, and the communication is continued.

In step S712, it is determined whether the communication has been ended. If it is determined that the communication has been ended, the process is ended (step S799). Otherwise, the process stands by until the communication is ended.

In step S714, it is determined whether the communication has been ended. If it is determined that the communication has been ended, the process is ended (step S799). Otherwise, the process returns to step S708.

In step S716, it is determined whether a connection by the communication B is possible. If it is determined that a connection by the communication B is possible, the process proceeds to step S718. Otherwise, the process returns to step S704.

In step S718, it is determined whether to perform the switching. If it is determined to perform the switching, the process proceeds to step S720. If it is determined not to perform the switching, the process proceeds to step S728. For example, the determination process in each of steps S516 and S616 illustrated in the flowcharts of FIGS. 5 and 6 may be performed.

In step S720, an instruction is made to switch the communication A of the service that is conducting communication, to the communication B. The instruction in step S720 corresponds to the instruction received in step S708.

In step S722, it is determined whether a connection by the communication A is possible. If it is determined that a connection by the communication A is possible, the process proceeds to step S724. Otherwise, the process stands by until the connection becomes possible.

In step S724, communication is started by the communication A.

In step S726, it is determined whether the communication has been ended. If it is determined that the communication has been ended, the process is ended (step S799). Otherwise, the process stands by until the communication is ended.

In step S728, communication is started by the communication B.

In step S730, it is determined whether the communication has been ended. If it is determined that the communication has been ended, the process is ended (step S799). Otherwise, the process stands by until the communication is ended.

Figure 8:
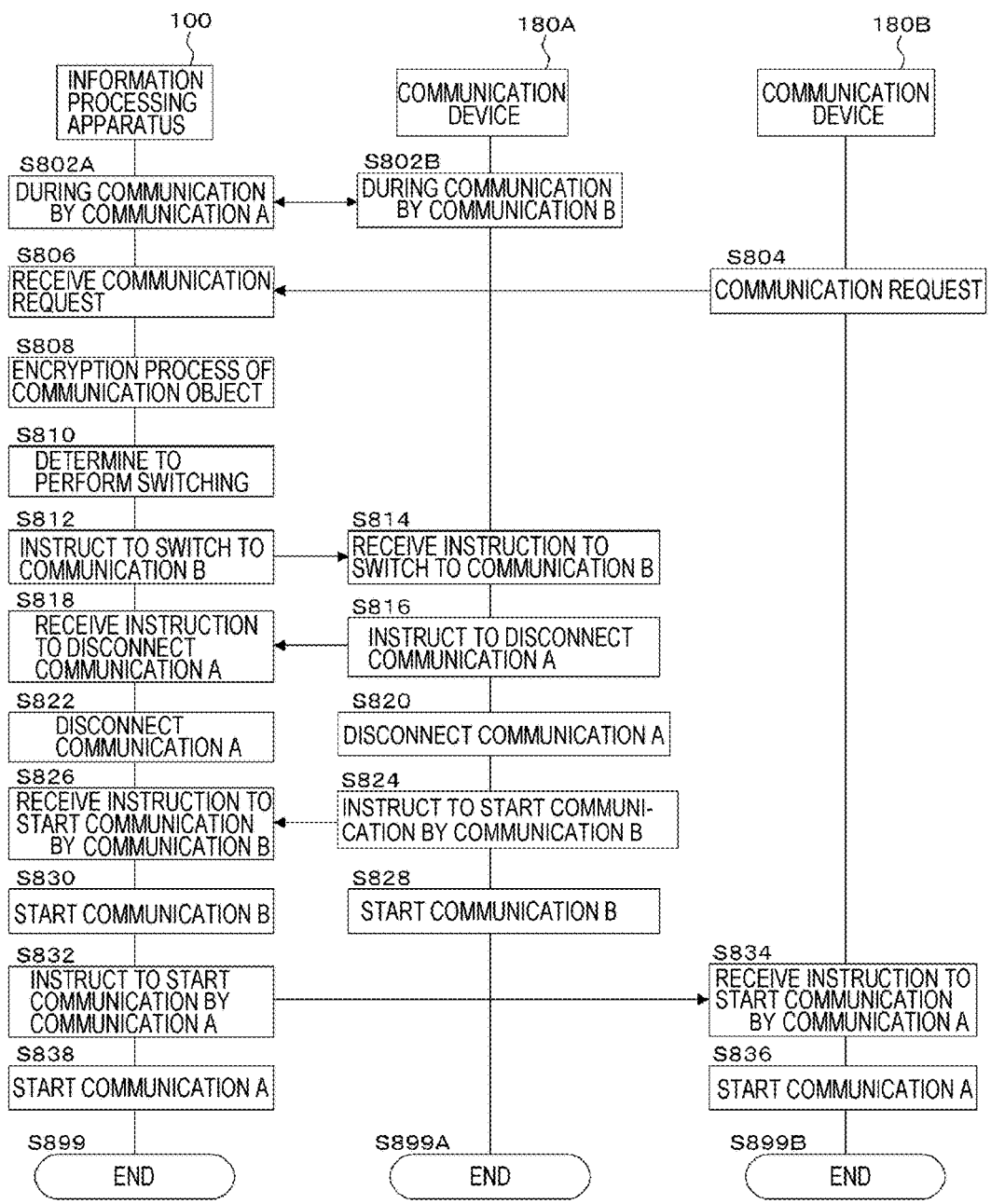
FIG. 8 is a flowchart illustrating an exemplary process by the exemplary embodiment.

FIG. 8 is a flowchart illustrating an exemplary process by the present exemplary embodiment. FIG. 8 illustrates an exemplary process in a case where the switching occurs, among the exemplary processes in the flowcharts illustrated in FIGS. 5 to 7. FIG. 8 represents an example where when the communication device 180A and the information processing apparatus 100 have already communicated with each other by the communication A having the fast communication speed (for example, the WiGig communication), a communication request is made from the communication device 180B, it is determined that the switching of the communication channels is necessary, the communication with the communication device 180A is switched to the communication B having the slow communication speed (for example, another Wi-Fi communication), and the communication with the Wi-Fi device 180B is conducted by the communication A having the fast communication speed.

In step S802A, the information processing apparatus 100 and the communication device 180A are communicating with each other by the communication A.

In step S802B, the communication device 180A and the information processing apparatus 100 are communicating with each other by the communication A.

In step S804, the communication device 180B transmits a communication request to the information processing apparatus 100. The communication request includes information indicating that the "communication object requires encryption."

In step S806, the information processing apparatus 100 receives the communication request from the communication device 180B.

In step S808, the information processing apparatus 100 performs the encryption process of the communication object. The process of step S808 may be performed at any time before the communication with the communication device 180B is started. In addition, in the example of FIG. 8, the information processing apparatus 100 performs the process of step S808. Alternatively, the communication device 180B may perform the encryption process. In general, the encryption process of the communication object itself is performed by the transmitting side of the communication object.

In step S810, the information processing apparatus 100 determines to perform the switching.

In step S812, the information processing apparatus 100 transmits an instruction to switch the communication A to the communication B, to the communication device 180A.

In step S814, the communication device 180A receives the instruction to switch the communication A to the communication B, from the information processing apparatus 100.

In step S816, the communication device 180A transmits an instruction to disconnect the communication A, to the information processing apparatus 100.

In step S818, the information processing apparatus 100 receives the instruction to disconnect the communication A, from the communication device 180A.

In step S820, the communication device 180A disconnects the communication A.

In step S822, the information processing apparatus 100 disconnects the communication A.

In step S824, the communication device 180A transmits an instruction to start a communication by the communication B, to the information processing apparatus 100.

In step S826, the information processing apparatus 100 receives the instruction to start the communication by the communication B, from the communication device 180A.

In steps S816 and S824, the instructions are transmitted from the communication device 180A to the information processing apparatus 100. Alternatively, in reverse, the instructions may be transmitted from the information processing apparatus 100 to the communication device 180A.

In step S828, the communication device 180A starts the communication B.

In step S830, the information processing apparatus 100 starts the communication B.

In step S832, the information processing apparatus 100 transmits an instruction to start a communication by the communication A, to the communication device 180B.

In step S834, the communication device 180B receives the instruction to start the communication by the communication A, from the information processing apparatus 100.

In step S836, the communication device 180B starts the communication A.

In step S838, the information processing apparatus 100 starts the communication A.

Figure 9:
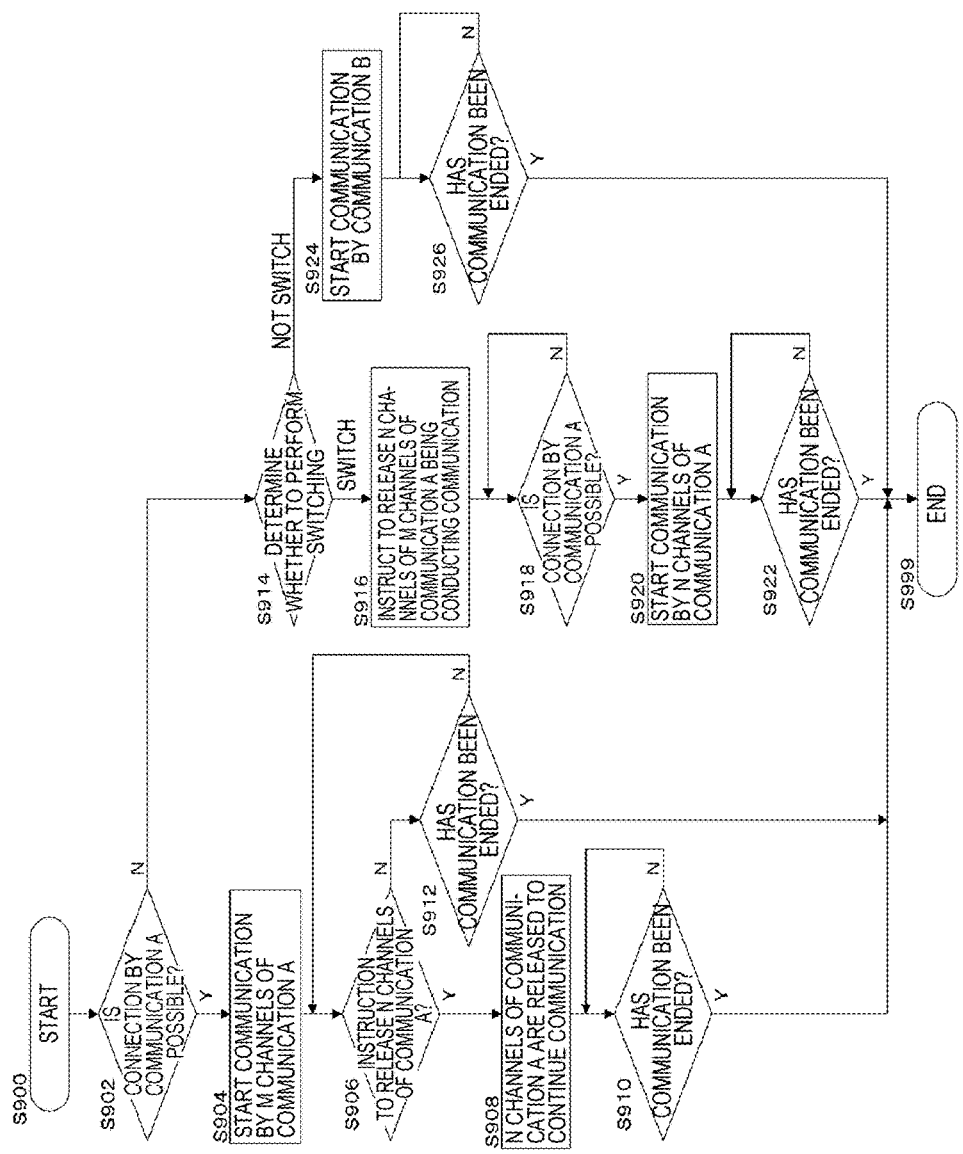
FIG. 9 is a flowchart illustrating an exemplary process by the exemplary embodiment.

FIG. 9 is a flowchart illustrating an exemplary process by the present exemplary embodiment.

In the flowchart of FIG. 9, M channels refer to the number of channels that may be used by the communication A at the same time (the number of channels used by the channel bonding). When the communication A is WiGig, the M channels are, for example, "four channels." N channels refer to the number of channels that is smaller than the M channels. N channels are, for example, "two channels." For example, if all of the four channels of the wireless communication module 135 (WiGig) having the fast communication speed are used, the four channels are reduced to two channels, and the reduced two channels are allocated to the wireless communication module 135 that is attempting to newly start a communication, and the communication is conducted.

In step S902, it is determined whether a connection by the communication A is possible. If it is determined that a connection by the communication A is possible, the process proceeds to step S904. Otherwise (for example, when the communication A has already been used), the process proceeds to step S914.

In step S904, a communication is started using the M channels of the communication A.

In step S906, it is determined whether an instruction to release the N channels of the communication A has been made. If it is determined that the instruction has been made, the process proceeds to step S908. Otherwise, the process proceeds to step S912.

In step S908, the N channels of the communication A are released, and the communication is continued.

In step S910, it is determined whether the communication has been ended. If it is determined that the communication has been ended, the process is ended (step S999). Otherwise, the process stands by until the communication is ended.

In step S912, it is determined whether the communication has been ended. If it is determined that the communication has been ended, the process is ended (step S999). Otherwise, the process returns to step S906.

In step S914, it is determined whether to switch channels. If it is determined to switch the channels, the process proceeds to step S916. If it is determined not to switch the channels, the process proceeds to step S924. For example, the determination process in each of steps S516 and S616 illustrated in the flowcharts of FIGS. 5 and 6 may be performed.

In step S916, an instruction is made to release the N channels of the M channels of the communication A that is conducting the communication. The instruction in step S916 corresponds to the instruction received in step S906.

In step S918, it is determined whether a connection by the communication A is possible. If it is determined that a connection by the communication A is possible, the process proceeds to step S920. Otherwise, the process stands by until the connection becomes possible.

In step S920, a communication is started using the N channels of the communication A.

In step S922, it is determined whether the communication has been ended. If it is determined that the communication has been ended, the process is ended (step S999). Otherwise, the process stands by until the communication is ended.

In step S924, a communication is started by the communication B. In this example, the communication is conducted by the communication B. Alternatively, the communication stands by until the communication A becomes free.

In step S926, it is determined whether the communication has been ended. If it is determined that the communication has been ended, the process is ended (step S999). Otherwise, the process stands by until the communication is ended.

Figure 10:
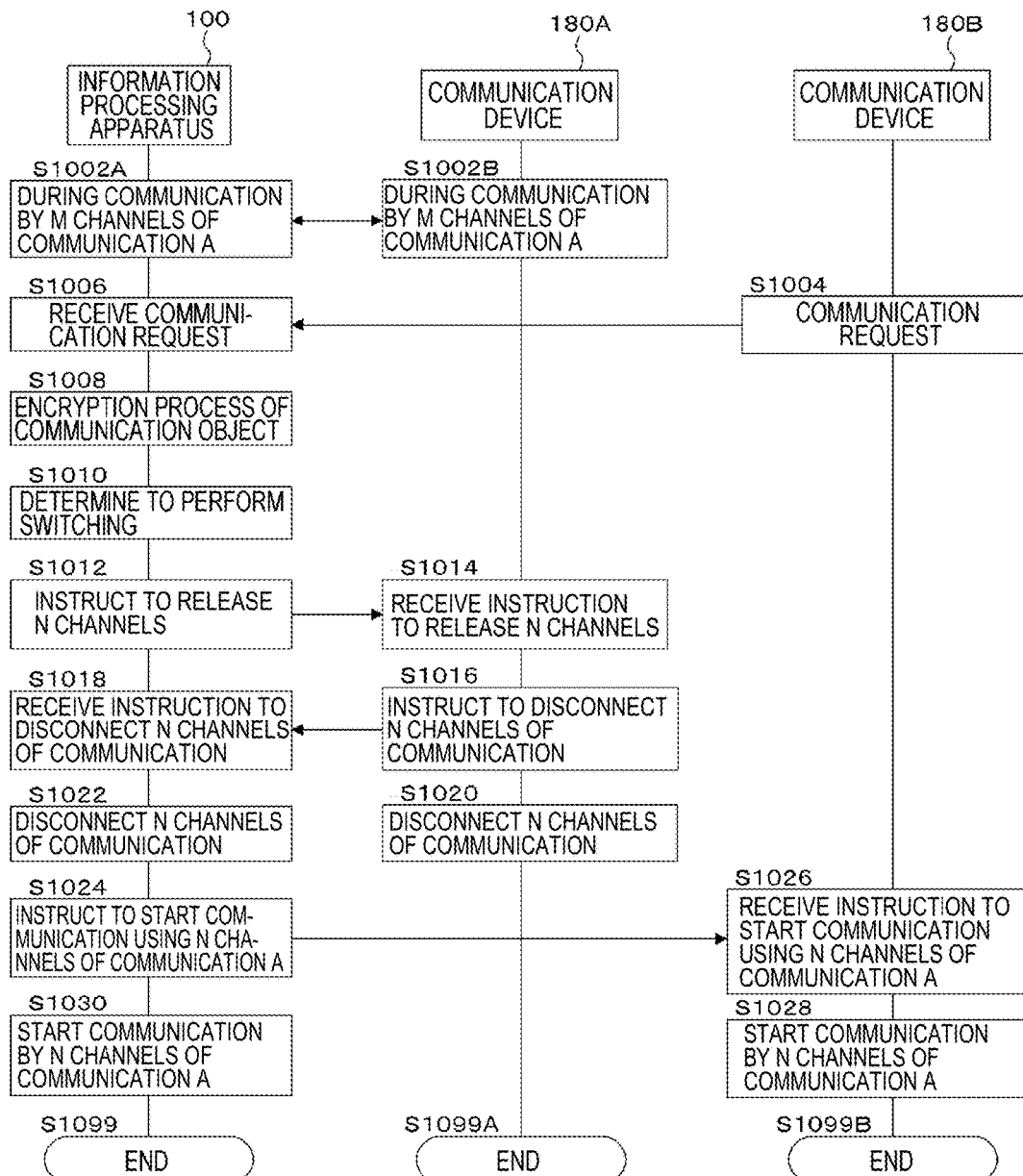
FIG. 10 is a flowchart illustrating an exemplary process by the exemplary embodiment.

FIG. 10 is a flowchart illustrating an exemplary process by the present exemplary embodiment. FIG. 10 represents an exemplary process in a case where the switching of the number of the channels occurs, in the exemplary process of the flowchart illustrated in FIG. 9. FIG. 10 represents an example where when the communication device 180A and the information processing apparatus 100 have already communicated with each other by using the M channels of the communication A having the fast communication speed (for example, the WiGig communication), a communication request is made from the communication device 180B, it is determined that the switching of the communication channels is necessary, the communication with the communication device 180A is switched to a communication by (M−N) channels, and the communication with the communication device 180B is conducted by using the N channels of the communication A.

In step S1002A, the information processing apparatus 100 and the communication device 180A are communicating with each other by using the M channels of the communication A.

In step S1002B, the communication device 180A and the information processing apparatus 100 are communicating with each other by using the M channels of the communication A.

In step S1004, the communication device 180B transmits a communication request to the information processing apparatus 100. The communication request includes information indicating that the "communication object requires encryption."

In step S1006, the information processing apparatus 100 receives the communication request from the communication device 180B.

In step S1008, the information processing apparatus 100 performs the encryption process of the communication object. The process of step S1008 may be performed at any time before the communication with the communication device 180B is started. In the example of FIG. 10, the information processing apparatus 100 performs the process of step S1008. Alternatively, the communication device 180B may perform the encryption process. In general, the encryption process of the communication object itself is performed by the transmitting side of the communication object.

In step S1010, the information processing apparatus 100 determines to perform the switching.

In step S1012, the information processing apparatus 100 transmits an instruction to release the N channels, to the communication device 180A.

In step S1014, the communication device 180A receives the instruction to release the N channels, from the information processing apparatus 100.

In step S1016, the communication device 180A transmits an instruction to disconnect the N channels of the communication, to the information processing apparatus 100.

In step S1016, the instruction is transmitted from the communication device 180A to the information processing apparatus 100. Alternatively, in reverse, the instruction may be transmitted from the information processing apparatus 100 to the communication device 180A.

In step S1018, the information processing apparatus 100 receives the instruction to disconnect the N channels of the communication, from the communication device 180A.

In step S1020, the communication device 180A disconnects the N channels of the communication.

In step S1022, the information processing apparatus 100 disconnects the N channels of the communication.

In step S1024, the information processing apparatus 100 transmits an instruction to start a communication using the N channels of the communication A, to the communication device 180B.

In step S1026, the communication device 180B receives the instruction to start a communication using the N channels of the communication A, from the information processing apparatus 100.

In step S1028, the communication device 180B starts a communication by the N channels of the communication A.

In step S1030, the information processing apparatus 100 starts a communication by the N channels of the communication A.

An exemplary hardware configuration of the information processing apparatus of the present exemplary embodiment will be described with reference to FIG. 11. The configuration illustrated in FIG. 11 is implemented by, for example, a personal computer (PC), and represents an exemplary hardware configuration provided with a data reading unit 1117 such as a scanner and a data output unit 1118 such as a printer.

Figure 11:
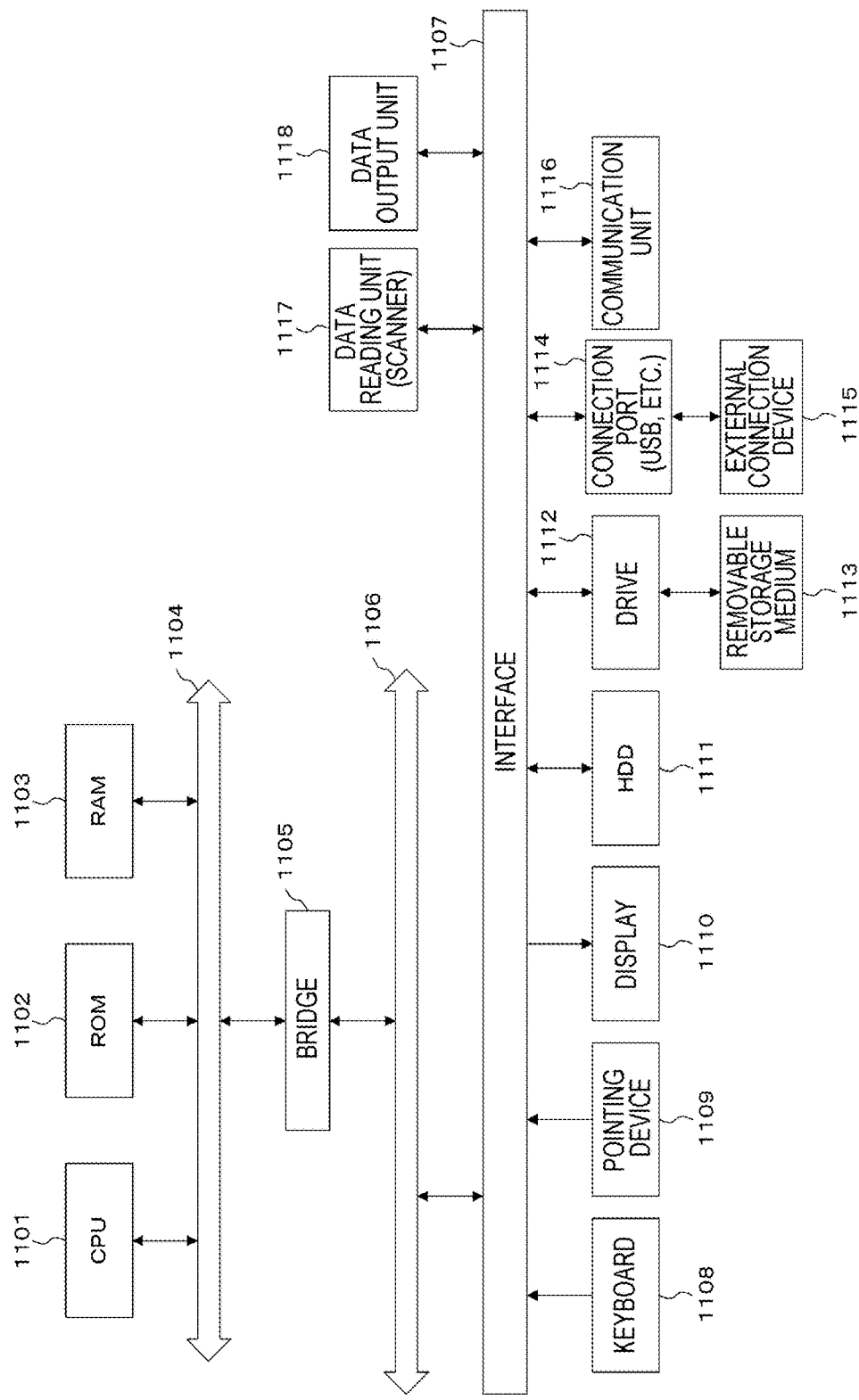
FIG. 11 is a block diagram illustrating an exemplary hardware configuration of a computer implementing the exemplary embodiment.

Further, while the example illustrated in FIG. 3 represents the configuration mainly serving as a chip using the ASIC or the like, the example illustrated in FIG. 11 mainly represents a functional configuration that is implemented by a personal computer or the like. For example, a CPU 1101 takes in charge of the functions by the SoC 300 and the ASIC 330.

The Central Processing Unit (CPU) 1101 serves as a controller that performs processes according to a computer program describing an execution sequence of each of the various modules described in the above-described exemplary embodiment, that is, the communication control module 110, the encryption module 115, the switching determination module 120, the switching module 125, the control module 130, the wireless communication modules 135 and the like.

A read only memory (ROM) 1102 stores programs, operation parameters, and the like used by the CPU 1101. A RAM 1103 stores programs used in the execution by the CPU 1101, parameters appropriately varying in the execution, and the like. These components are connected to each other by a host bus 1104 configured with a CPU bus or the like.

The host bus 1104 is connected to an external bus 1106 such as a peripheral component interconnect/interface (PCI) bus via a bridge 1105.

A keyboard 1108 and a pointing device 1109 such as a mouse are devices operated by an operator. A display 1110 is, for example, a liquid crystal display device or a cathode ray tube (CRT), and displays various types of information as texts and image information. In addition, a touch screen or the like having the functions of both the pointing device 1109 and the display 1110 may be used. In this case, the function of the keyboard may be implemented by drawing the keyboard using software (also called a so-called software keyboard, screen keyboard or the like) on the screen (the touch screen), without the physical connection like the keyboard 1108.

A hard disk drive (HDD) 1111 is equipped with a hard disk (which may be a flash memory or the like) therein, drives the hard disk, and stores or plays programs or information executed by the CPU 1101. In the hard disk, priorities of predetermined services, communication objects (an encrypted communication object, a non-encrypted communication object, and a decrypted communication object) and the like are stored. Further, in the hard disk, other various data and various computer programs are stored.

A drive 1112 reads data and programs stored in a removable storage medium 1113 such as a mounted magnetic disk, optical disc, magneto-optical disc, or semiconductor memory, and supplies the data or programs to the interface 1107, the external bus 1106, the bridge 1105, and the RAM 1103 connected via the host bus 1104. In addition, the removable storage medium 1113 may also be used as a data storage area.

A connection port 1114 is a port for connection of an external connection device 1115, and includes connection units such as USB and IEEE 1394. The connection port 1114 is connected to the CPU 1101 and the like via the interface 1107, the external bus 1106, the bridge 1105, the host bus 1104, and the like. A communication unit 1116 is connected to a communication line and performs a process of a data communication with an external device. The data reading unit 1117 is, for example, a scanner and performs a document reading process. The data output unit 1118 is, for example, a printer, and performs a document data outputting process.

The hardware configuration of the information processing apparatus illustrated in FIG. 11 represents an exemplary configuration. The present exemplary embodiment is not limited to the configuration illustrated in FIG. 11, and may be any configuration that may execute the modules described in the present exemplary embodiment. For example, some of the modules may be configured with dedicated hardware (for example, application specific integrated circuit (ASIC)), and some of the modules maybe in the form in which the modules are present in an external system and connected via a communication line. Further, the multiple systems illustrated in FIG. 11 may be connected to each other via a communication line and cooperate with each other. In addition, especially, the multiple systems of FIG. 12 may be incorporated in a personal computer, a portable information communication device (including a mobile phone, a smart phone, a mobile device, a wearable computer, and the like), an information appliance, a robot, a copying machine, a facsimile, a scanner, a printer, a multi-functional machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, the communication device 180 may include the information processing apparatus 100. For example, an image processing apparatus having no information processing apparatus 100 and the communication device 180 having the information processing apparatus 100 may communicate with each other. Alternatively, the image processing apparatus 200 having the information processing apparatus 100 and the communication device 180 having the information processing apparatus 100 may communicate with each other.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs maybe all or parts of other programs, or may be stored together with separate programs in the storage medium. In addition, the above-described programs maybe divided and stored in multiple storage media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus configured to transmit or receive: (a) a first communication object, which is not encrypted; and (b) a second communication object, which has been or will be encrypted, the information processing apparatus comprising:
    a plurality of communication units configured to conduct a wireless communication at different communication speeds, the plurality of communication units including at least a first communication unit that conducts communication at a relatively faster speed, and a second communication unit that conducts communication at a relatively slower speed; and
    a controller configured to control communication by the plurality of communication units,
    wherein, upon occurrence of conditions including: (a) if the first communication object is being transmitted or received by the first communication unit; and (b) if the second communication object needs to be transmitted or received by the information processing apparatus, the controller is configured to:
        (i) end transmission or reception of the first communication object by the first communication unit;
        (ii) begin transmission or reception of the second communication object by the first communication unit; and
        (iii) begin transmission or reception of the first communication object by the second communication unit.

2. The information processing apparatus according to claim 1, further comprising:
    a determination unit configured to determine a communication unit of the plurality of communication units to transmit or receive the second communication object,
    wherein the determination unit is configured to determine the communication unit in accordance with a data amount increased by the encryption of the second communication object.

3. The information processing apparatus according to claim 1, further comprising:
    a determination unit configured to determine a communication unit of the plurality of communication units to transmit or receive the second communication object,
    wherein the determination unit is configured to determine the communication unit in accordance with a communication time increased by the encryption of the second communication object.

4. The information processing apparatus according to claim 1, further comprising:
    a determination unit configured to determine a communication unit of the plurality of communication units to transmit or receive the second communication object,
    wherein the determination unit is configured to determine the communication unit in accordance with a time required for the encryption of the second communication object.

5. The information processing apparatus according to claim 1, further comprising:
    a determination unit configured to determine a communication unit of the plurality of communication units to transmit or receive the second communication object,
    wherein the determination unit is configured to determine the communication unit in accordance with a power amount required for the encryption of the second communication object.

6. The information processing apparatus according to claim 1, wherein
    each of the plurality of communication units includes a plurality of channels, and
    if the first communication unit uses the plurality of channels, and a determination is made to switch channels, the controller is configured to reduce the number of channels allocated to the first communication unit and allocate the reduced number of channels to the second communication unit that is attempting to start a communication.

7. A non-transitory computer readable storage medium storing an information processing program for transmitting or receiving: (a) a first communication object, which is not encrypted; and (b) a second communication object, which has been or will be encrypted, the information processing program causing a processor to function as:
    a plurality of communication units configured to conduct a wireless communication at different communication speeds, the plurality of communication units including at least a first communication unit that conducts communication at a relatively faster speed, and a second communication unit that conducts communication at a relatively slower speed; and
    a controller configured to control communication by the plurality of communication units,
    wherein, upon occurrence of conditions including: (a) if the first communication object is being transmitted or received by the first communication unit; and (b) if the second communication object needs to be transmitted or received by the information processing apparatus, the controller is configured to:
        (i) end transmission or reception of the first communication object by the first communication unit;
        (ii) begin transmission or reception of the second communication object by the first communication unit; and
        (iii) begin transmission or reception of the first communication object by the second communication unit.

8. An information processing apparatus configured to transmit or receive: (a) a first communication object, which is not encrypted; and (b) a second communication object, which has been or will be encrypted, the information processing apparatus comprising:
    a plurality of communication means for conducting a wireless communication at different communication speeds, the plurality of communication means including at least a first communication means that conducts communication at a relatively faster speed, and a second communication means that conducts communication at a relatively slower speed; and
    a control means for controlling communication by the plurality of communication means,
    wherein, upon occurrence of conditions including: (a) if the first communication object is being transmitted or received by the first communication unit; and (b) if the second communication object needs to be transmitted or received by the information processing apparatus, the controller is configured to:

(i) end transmission or reception of the first communication object by the first communication unit;
(ii) begin transmission or reception of the second communication object by the first communication unit; and
(iii) begin transmission or reception of the first communication object by the second communication unit.

9. The information processing apparatus according to claim 1, wherein
the conditions further include: (c) if a priority of the transmission or reception of the first communication object is lower than a priority of the transmission or reception of the second communication object, such that upon occurrence of the conditions (a), (b) and (c), the controller is configured to: (i) end transmission or reception of the first communication object by the first communication unit; and (ii) begin transmission or reception of the second communication object by the first communication unit, and the first communication object by the second communication unit.

* * * * *